United States Patent
Shendar

(12) 
(10) Patent No.: US 6,519,011 B1
(45) Date of Patent: Feb. 11, 2003

(54) DIGITAL TELEVISION WITH MORE THAN ONE TUNER

(75) Inventor: Noam A. Shendar, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/533,349

(22) Filed: Mar. 23, 2000

(51) Int. Cl.[7] .................................................. H04N 5/50
(52) U.S. Cl. ........................................ 348/731; 348/732
(58) Field of Search ................................. 348/731–733, 348/725, 726, 385, 387, 554, 555; 455/166.1, 166.2, 167.1; H04N 5/50

(56) References Cited

U.S. PATENT DOCUMENTS

| | | | | |
|---|---|---|---|---|
| 5,933,192 A | * | 8/1999 | Crosby et al. | 348/725 |
| 6,118,498 A | * | 9/2000 | Reitmeier | 348/725 |
| 6,334,217 B1 | * | 12/2001 | Kim | 424/581 |

* cited by examiner

Primary Examiner—Michael H. Lee
(74) Attorney, Agent, or Firm—Trop, Pruner & Hu, P.C.

(57) ABSTRACT

A digital television may be implemented with more than one front end section so that more than one channel may be tuned at any given time. Thus, the delay inherent in acquiring a new channel in digital television system may be ameliorated because one tuner may tune to a current channel and another tuner may tune to another channel which the user is likely to tune to next.

15 Claims, 3 Drawing Sheets

| Switch | 1 | 2 | 3 |
|---|---|---|---|
| Tuner 12a | Current Channel (Active) | Prev. Channel (Standby) | Next Channel (Standby) |
| Tuner 12b | Next Channel (Standby) | Current Channel (Active) | Prev. Channel (Standby) |
| Tuner 12c | Prev. Channel (Standby) | Next Channel (Standby) | Current Channel (Active) |

*FIG. 2*

DIGITAL TELEVISION WITH MORE THAN ONE TUNER

BACKGROUND

This invention relates to digital televisions.

Digital televisions include an antenna, a tuner, a demodulator and a decoder coupled to a display. Because of the nature of a digital television system, a delay is involved in displaying a newly selected channel. Firstly, this is in part due to the fact that digital television tuners lock on new channels more slowly than analog tuners. Secondly, a demodulator may contain an equalizer which does not exist in analog television receivers. These equalizers take time to converge. Thirdly, program stream information is read in order to extract different program elements, such as video and audio, from the broadcast stream to the respective decoders. This is known as demultiplexing.

The video decoding of the demultiplexed signal is the source of still additional delay. A Moving Pictures Experts Group (MPEG) decoder waits for picture parameters such as a valid Intra-coded frame (I-frame), Group of Pictures (GOP) information, and certain buffer fullness indications before it may begin decoding. As a result of all these factors, channel changing may be delayed.

Thus, there is a need for a way to allow digital televisions to switch channels more quickly.

BRIEF DESCRIPTION OF THE DRAWINGS

FIG. 2 is a chart showing a tuner switch sequence in accordance with one embodiment of the present invention.

DETAILED DESCRIPTION

Figure 1:
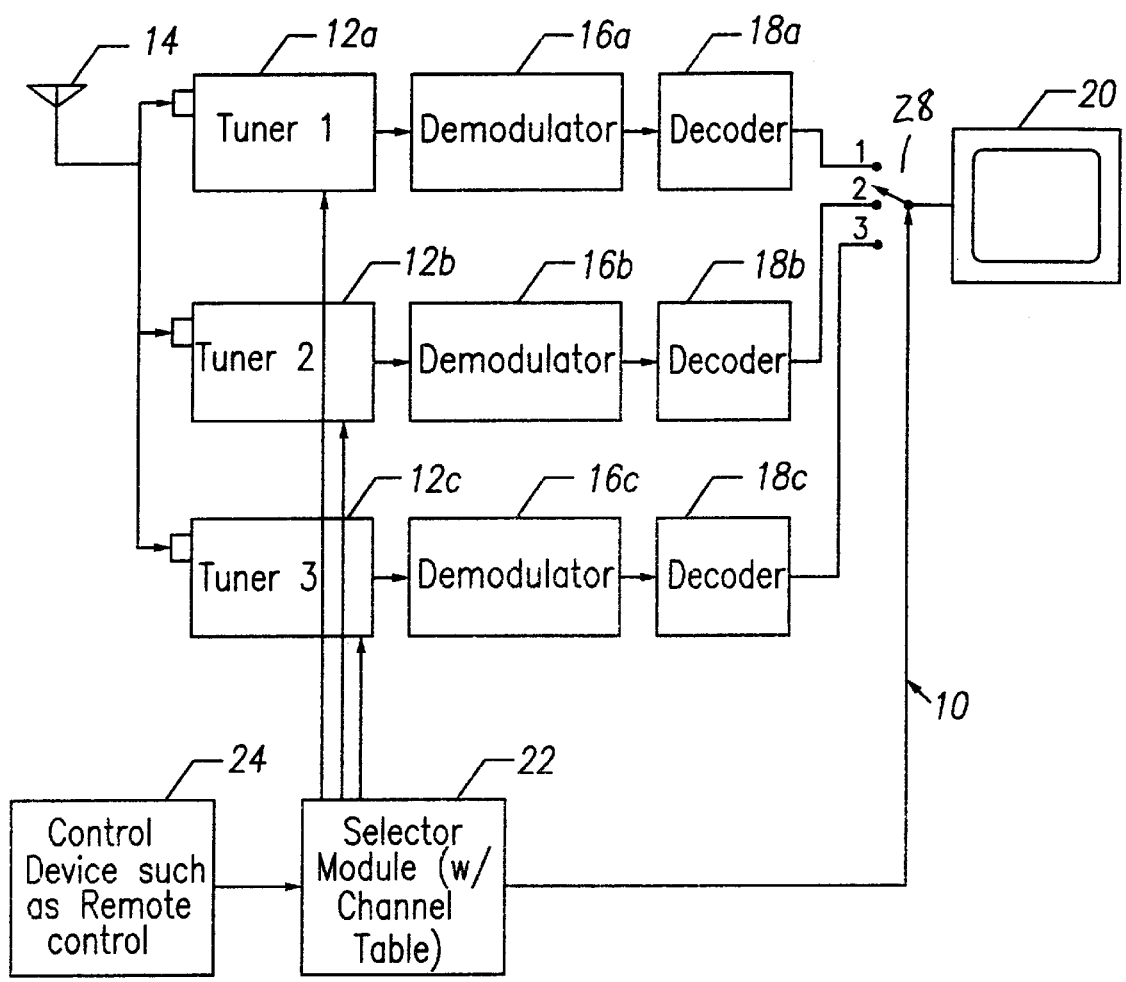
FIG. 1 is a block depiction of one embodiment of the present invention.

A digital television system 10, shown in FIG. 1, includes three front end sections each formed of a tuner 12, a demodulator 16 and a decoder 18, all selectively connectable to a display 20. Thus, the system 10 may simultaneously tune to three different channels even if only one channel is displayed on the television display 20 at a time. The use of multiple front end sections allowing multiple channels to be tuned at one time has many advantages. In particular, it is advantageous in overcoming the delay which digital systems encounter in displaying new channels.

Each of the tuners 12a, 12b and 12c is coupled to an antenna 14 or other source of video information such as a cable connection or a satellite antenna. Each tuner 12a, 12b and 12c is also coupled to a demodulation section 16a, 16b or 16c. Each of the tuners 12 may controlled by a selector module 22 that uses a channel table. The selector module 22 may have a semiconductor memory which stores the channel table and provides selection signals to control the tuned channel for each tuner 12. In addition, the selector module 22 may be coupled to a channel control device 24 such as a remote control.

Each demodulator section 16 is coupled to its own decoder 18a, 18b or 18c. Thus, each front end section consisting of a tuner 12, demodulator 16 and a decoder 18 may be selected by the switch 28. While the switch 28 is shown schematically as a simple rotating switch, an electronic switch would normally be utilized. The switch 28 selects one of the front end sections, including one of the tuners, under control of the selector module 22. Thus, only one front end section is coupled to the display 20 at any particular time in one embodiment of the present invention. In a picture-in-picture embodiment of the present invention, more than one tuner may be coupled to the display. at any given time.

Referring next to FIG. 2, a channel table 26 may be stored in a memory associated with the selector module 22. The memory may be a semiconductor memory or may be hard-wired into the selector module 22. The table 26 includes vertical entries for each tuner 12a, 12b and 12c. Three different stages, indicated by the numbers one, two and three, are indicated horizontally for each tuner. Each stage corresponds to a channel change to a new active channel. Channels may be active or standby. An active channel is tuned and displayed. A standby channel is tuned but not displayed. A current channel is the currently displayed channel or active channel. A previous channel is a standby channel that was displayed on the display 20 before the display of the current channel. The next channel is a standby channel which is a channel predicted to be displayed next on the display 20.

The prediction of the next channel may be accomplished in a number of different ways. In one embodiment of the present invention, if a series of rapid channel changes have occurred, the system may predict that the next channel to be selected is the next channel in sequence. Thus, if the user quickly changes from channel two to channel three, the system may project that the next channel change will be to channel four. Similarly, if the user is switching between channels two, four and six repetitively, the system may at any one point in time have channel two as the current active channel, channel four as the previous channel and predict channel six to be the next channel based on the past history.

Thus, the stored channel selections for the tuner 12a, for example, are indicated in the table 26. At stage one, the tuner 12a may display the active channel which is currently displayed on the display 20. At stage two, the tuner 12a will then necessarily have the previous channel selection. This is because the tuner tuned to the current channel continues to be tuned to that channel in the next stage when the system transitions to a new active channel. Thus, it is not necessary to recapture a channel in case the user decides to go back to the previous channel. For the third stage, the tuner 12a tunes the next channel.

In stage two, the tuner 12b captures the current active channel and in stage three the tuner 12c becomes the current active tuner. Thus, the tuners 12a, 12b and 12c cycle successively to tune the current active channel. In each case after a tuner displays the current channel, it then becomes the previous channel tuner. A tuner may only change its tuned channel every third stage (if the next channel prediction is accurate) in one embodiment of the invention.

Thus, for example, the tuner 12a may be tuned to the active channel, such as channel two, at stage one. When the system changes to channel four, in stage two, the tuner 12a is still tuned to the channel two which is now a standby channel. If channel six is the next predicted channel, the tuner 12a transitions to channel six in stage three. In stage four, the tuner 12a becomes the active channel and if the prediction was correct, no channel change is required. Thus, it may be appreciated that each tuner maintains its tuning through two channel changes or stages if the next channel prediction is accurate.

The provision of multiple front end sections has many advantages. In addition to reducing the delay in acquiring new channels, multiple tuners may be utilized for multiple picture-in-picture displays. They may also be useful in recording one channel while viewing another channel. In connection with a system which consistently follows a given channel, for example to record information off of that channel, the television display may always be tuned to a different channel while the system continues to capture the ongoing broadcast.

Some of the front end sections may be dedicated to other functions such as picture-in-picture functions over some time interval. When those other functions are not selected, the dedicated tuner may be re-dedicated to achieving the system illustrated in FIG. 2.

Figure 3:
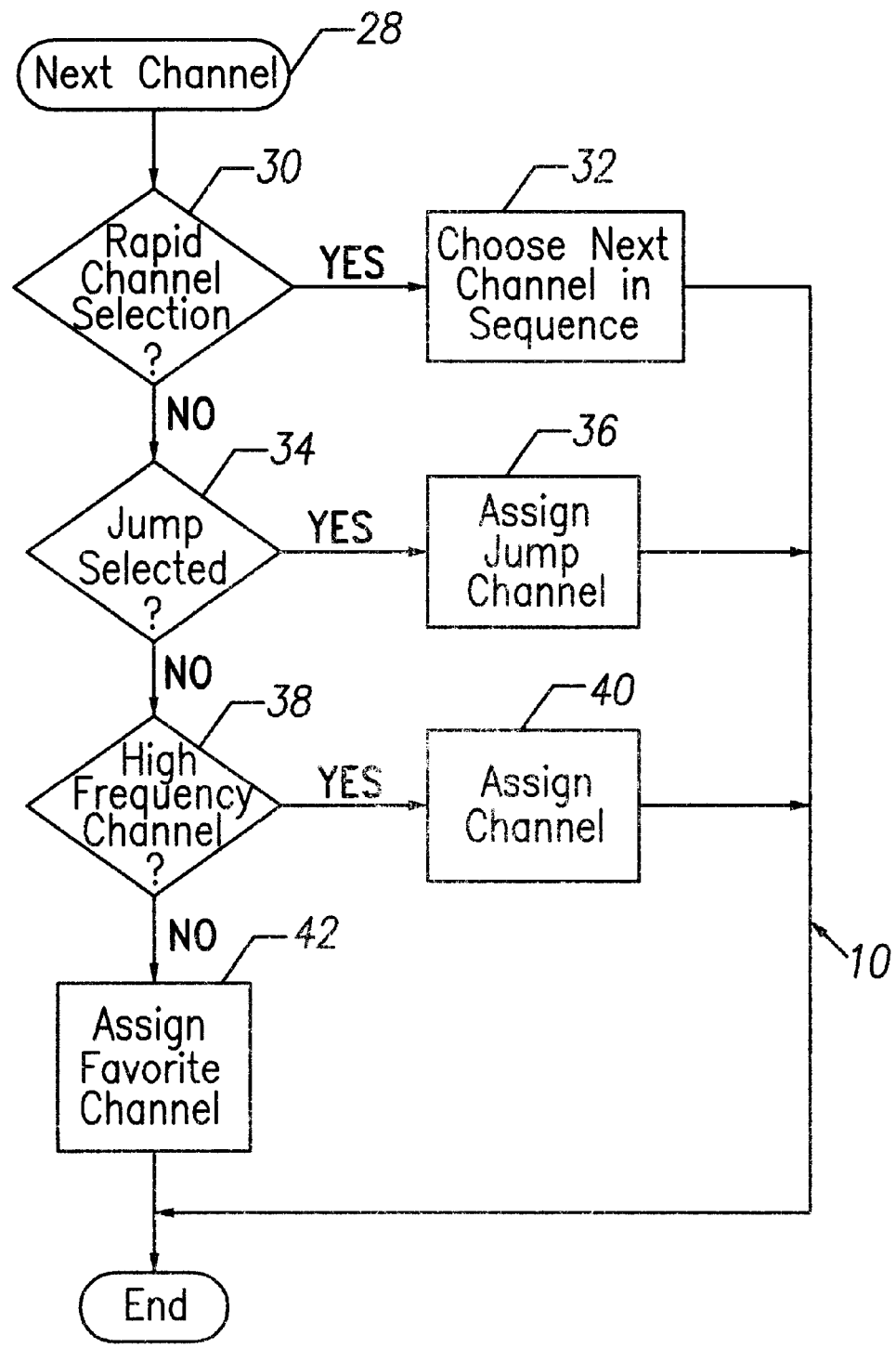
FIG. 3 is a flow chart in accordance with one embodiment of the invention.

Referring next to FIG. 3, a technique for predicting the next channel may be implemented in software or hardware. Initially, a check at diamond 30 determines whether there is a sequential channel selection. This corresponds to the user simply pressing the up or down channel button on a remote control unit and quickly scanning through channels to see what is available. In such case, the next channel in the sequence is chosen as the next channel as indicated in block 32. Otherwise, a check at diamond 34 determines whether the user has programmed a jump channel. A jump channel is one which the user has programmed to be selected by pressing a jump button on the remote control. If the user has selected a jump channel, as determined at diamond 34, the jump channel is the assigned as the next channel as indicated in block 36.

Otherwise, at diamond 38, a decision is made as to whether there is a so-called high frequency channel. A high frequency channel is one to which the user has repeatedly tuned in a recent time period. For example, a check may determine whether in a time interval of thirty minutes, the user has tuned to a given channel more than a given number of times such as three times. If so, that channel is determined to be a high frequency channel and is assigned as the next channel as indicated in block 40.

If no high frequency channel can be identified, the user's favorite channel is assigned as the next channel as indicated in block 42. The user's favorite channel is that channel which is tuned most often. Thus, a running count may be made in a memory of which channels get tuned. When the channel is chosen as the favorite channel, it may commonly be prestored as the next available channel.

In each case, if a determination at diamonds 30, 34 or 38 results in a channel which is a previous channel or a currently active channel, that channel selection is discarded. The flow then proceeds to the next diamond decision block.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   tuning a first tuner to an active channel;
   predicting the next active channel based on the rapidity with which channel changes are occurring; and
   tuning a second tuner to a standby channel to be displayed at a later time based on said prediction of the next active channel.

2. The method of claim 1 including tuning a third tuner to a previously active channel.

3. The method of claim 2 including selecting one of said first, second, or third tuners based on a selection received from a user.

4. The method of claim 2 including tuning said first, second and third tuners to the active channel after tuning to two other channels.

5. An article comprising a medium storing instructions that, if executed, enable a processor-based system to:
   tune a first tuner to an active channel;
   predict the next active channel based on the rapidity with which channel changes are occurring; and
   tune a second tuner to a standby channel to be displayed at a later time based on said prediction.

6. The article of claim 5 further storing instructions that cause a processor-based system to tune a third tuner to a previously active channel.

7. The article of claim 6 further storing instructions that cause a processor-based system to select one of the first, second or third tuners based on a selection received from a user.

8. The article of claim 6 further storing instructions that cause a processor-based system to tune said first, second and third tuners to the active channel after tuning to two other channels.

9. A television receiver comprising:
   a first tuner that selectively tunes to either an active channel or a standby channel to be displayed at a later time;
   a second tuner that selectively tunes to an active channel or a standby channel to be displayed at a later time; and
   a controller that selects one of said first and second tuners to tune to the active channel and the other of said first and second tuners to tune to the standby channel, said controller to select the standby channel based on the rapidity with which channel changes are occurring.

10. The system of claim 9 further including a third tuner selectively tunable to an active channel or a standby channel.

11. A The receiver of claim 10 including a pair of demodulators and decoders, wherein each of said tuners is coupled to a demodulator which in turn is coupled to a decoder.

12. The receiver of claim 11 including a switch and a television display, wherein each of said decoders is coupled to said switch which selectively couples one of said decoders to a television display.

13. The receiver of claim 12 including a selector module for selecting one of said tuners to display the active channel, said selector module including a table which stores channel assignments for each of said tuners.

14. The receiver of claim 13 wherein each of said tuners tunes in succession to one of a current channel, a previous channel and a next channel predicted to be a channel which a user will select in the future.

15. The receiver of claim 14 wherein when one tuner is tuned to the current channel and the other tuners are tuned to standby channels including either the next channel or the previous channel.

* * * * *